US009975482B2

(12) United States Patent
Sinclair (10) Patent No.: US 9,975,482 B2
(45) Date of Patent: May 22, 2018

(54) SYSTEMS AND METHODS FOR TRAFFIC EVENT DETECTION FOR VEHICLES USING ROLLING AVERAGES

(71) Applicant: Eric Sinclair, Leesburg, VA (US)

(72) Inventor: Eric Sinclair, Leesburg, VA (US)

( * ) Notice: Subject to any disclaimer, the term of this patent is extended or adjusted under 35 U.S.C. 154(b) by 0 days. days.

(21) Appl. No.: 15/215,394

(22) Filed: Jul. 20, 2016

(65) Prior Publication Data

US 2016/0328629 A1 Nov. 10, 2016

Related U.S. Application Data

(63) Continuation-in-part of application No. 14/170,313, filed on Jan. 31, 2014, now abandoned.

(51) Int. Cl.
*G06K 9/00* (2006.01)
*B60Q 9/00* (2006.01)
(Continued)

(52) U.S. Cl.
CPC ............ *B60Q 9/008* (2013.01); *B60R 11/04* (2013.01); *G06K 9/00825* (2013.01);
(Continued)

(58) Field of Classification Search
None
See application file for complete search history.

(56) References Cited

U.S. PATENT DOCUMENTS 6,137,531 A * 10/2000 Kanzaki ............. B60K 31/0008
348/149
8,615,357 B2 * 12/2013 Simon ................... B60W 30/16
340/435
(Continued)

FOREIGN PATENT DOCUMENTS

WO  WO 0143104 A1 *  6/2001  ............... G08G 1/04

OTHER PUBLICATIONS

Almagambetov, A., Velipasalar, S., & Casares, M. (2015). Robust and computationally lightweight autonomous tracking of vehicle taillights and signal detection by embedded smart cameras. IEEE Transactions on Industrial Electronics, 62(6), 3732-3741.*
(Continued)

*Primary Examiner* — Vu Le
*Assistant Examiner* — Samah Beg
(74) *Attorney, Agent, or Firm* — Scott D. Balderston (57) ABSTRACT

Platforms and techniques are described in which a traffic event detection system includes a camera connected to a CPU in a vehicle. The camera is mounted on an extendable support, and captures images in front of the vehicle at a height generally above that of vehicles that may be ahead of the subject vehicle. The CPU can analyze those images for sudden change in traffic pattern based on a change in red color content of the image stream, and can warn the driver with an alert if the cars in front of him or her brake suddenly, or other traffic events occur. In implementations, short-term and long-term signal averages can be used to reduce false positive signals, and increase overall accuracy of traffic detection processing. In embodiments, the system can apply a timer to determine if potential hazards continue to be detected, and generated louder alarms or other graduated alerts.

6 Claims, 7 Drawing Sheets

(51) Int. Cl.
*H04N 5/225* (2006.01)
*G06K 9/46* (2006.01)
*B60R 11/04* (2006.01)
*G08G 1/16* (2006.01)
*G06T 7/254* (2017.01)

(52) U.S. Cl.
CPC ............ G06K 9/4652 (2013.01); G06T 7/254 (2017.01); G08G 1/166 (2013.01); H04N 5/2253 (2013.01); *G06T 2207/10016* (2013.01); *G06T 2207/10024* (2013.01); *G06T 2207/30236* (2013.01); *G06T 2207/30252* (2013.01)

(56) References Cited

U.S. PATENT DOCUMENTS

| | | | |
|---|---|---|---|
| 2014/0218530 A1* | 8/2014 | Sinclair | G08G 1/00 348/148 |
| 2015/0120160 A1* | 4/2015 | Foltin | B60W 30/0956 701/70 |

OTHER PUBLICATIONS

Almagambetov, A., & Velipasalar, S. (2014). Autonomous Tracking of Vehicle Taillights and Alert Signal Detection by Embedded Smart Cameras. In Distributed Embedded Smart Cameras (pp. 121-150). Springer New York.*

* cited by examiner

SYSTEMS AND METHODS FOR TRAFFIC EVENT DETECTION FOR VEHICLES USING ROLLING AVERAGES

CROSS-REFERENCE TO RELATED APPLICATIONS

This application claims the benefit, including priority, of U.S. patent application Ser. No. 14/170,313 entitled "Traffic Event Detection System for Vehicles," filed Jan. 31, 2014, by the same inventor herein, and owned, assigned, or under obligation of assignment by or to the same entity as this application, and from which application this application forms a continuation-in-part. This application also claims the benefit, including priority, of U.S. Provisional Patent Application No. 61/849,699, filed Feb. 1, 2013, entitled "Traffic Event Detection System for Automotive Vehicles," by the same inventor herein, owned, assigned, or under obligation of assignment by or to the same entity as this application. This application incorporates U.S. patent application Ser. No. 14/170,313, and U.S. Provisional Patent Application No. 61/849,699, by reference herein in their entireties.

FIELD

The present teachings are related to traffic event detection, and more particularly, to systems, platforms, methods, and techniques for automotive and other vehicles to increase safety in case of sudden and abrupt change in traffic conditions by forward detection of hazardous, unexpected, or anomalous driving conditions.

BACKGROUND

While driving on a highway, freeway, or other roads, traffic in front of a vehicle may suddenly or unpredictably slow down or come to an abrupt stop. The traffic event can involve the abrupt braking of one car or multiple cars in front of a vehicle, and the car or cars which are braking may be relatively close or farther ahead of the operator's own vehicle. To allow the operator of a vehicle to have greater situational awareness and respond faster to the changes in traffic condition, a system would be advantageous that is able to detect an event happening ahead of the vehicle, decode or analyze the event to determine if an actual braking or other emergency is taking place, and alert or alarm the motorist of the detected event in real-time or near real-time.

It would be a further advantage for the detection system and techniques to offer resistance to spurious or noisy signals which could falsely indicate traffic event activity.

SUMMARY

The system addressing these and other needs can be or include a vehicle-mounted platform comprising a sensor element or elements, such as a video camera mounted on a vehicle to capture the images of the traffic ahead, a central processing unit (CPU) and/or other logic to process image streams captured by the camera, and software and/or logic that analyses the images in the captured stream and detects events taking place ahead of the vehicle. The system can also include a video display that presents the images captured by the camera and a powered speaker or other device to generate an audible alarm, visual display, and/or other indication that warns the driver of the vehicle of traffic events or troubles ahead.

According to aspects, while the vehicle is in motion, the camera can monitor or sample the field of view in front of the vehicle, including other vehicles in proximity to the vehicle equipped with systems according to the invention. In a case where one or more of the other vehicles slow down by applying the brake pedal, the software associated with the sensor can automatically detect an increase in red light intensity present in the field of view, due to the activation of brake lights in the vehicles ahead. The system can recognize that change in color or spectral content, and notify the driver by emitting an alarm sound. In implementations, the detection logic can generate at least a short-term and a long-term average for the red color content, and compare those averages to determine whether a traffic event is taking place. In embodiments, the system can also or instead employ one or more timed periods to recheck for red color intensification, and generate graduated alerts when detected traffic activity continues. A video display can also be installed inside the vehicle above the driver, for example near the sun visor, to present additional information and/or to provide the driver with a complementary visual aid.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
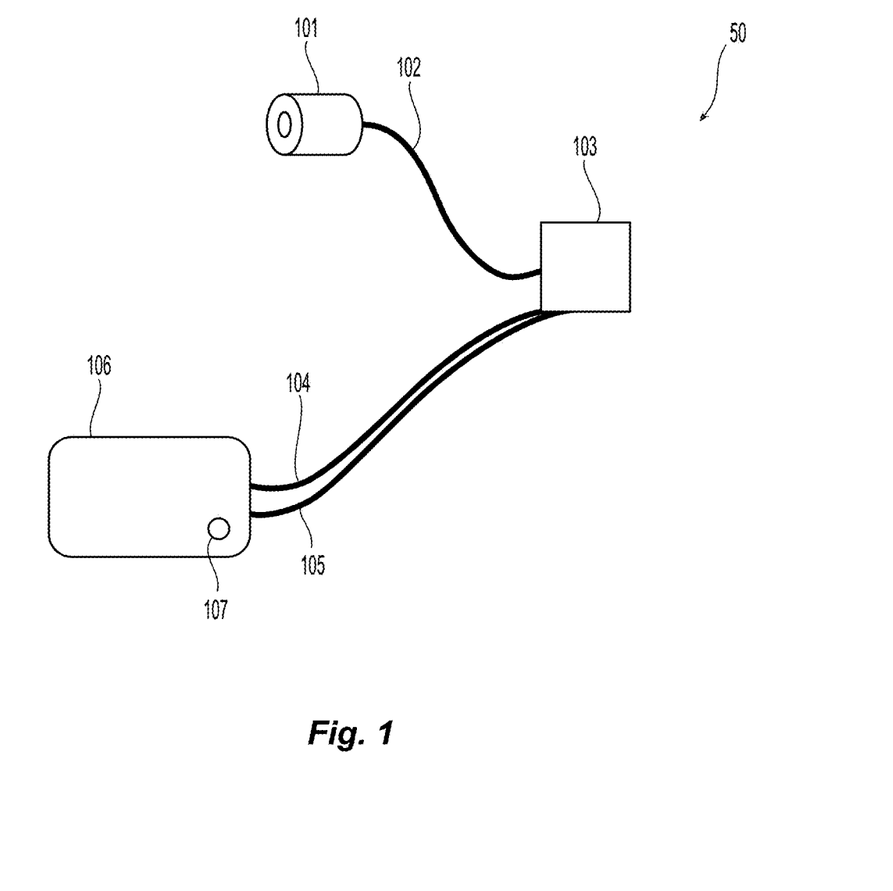
FIG. 1 illustrates various components and configurations of systems and platforms according to aspects of the present teachings.

Referring to the drawings, FIG. 1 shows an illustrative overall system 50 in standalone form, not installed on a vehicle. The sensor 101 is connected to a CPU 103 by a cable 102. The sensor 101 can be or include, for example, a video camera, such as a digital device using a charge coupled device (CCD) sensor array. Other types of sensing elements or other devices can be used, including, merely for example, complementary metal oxide semiconductor (CMOS) sensing elements, and/or forward looking infrared (FLIR) sensors. In implementations, sensors operating on other types of signals, such as acoustic sensors, can be used in addition to or instead of visual detectors. In implementations, the sensor 101 can comprise two or more sensors, and/or multiple sensor elements in one housing or unit, or otherwise.

While sensor 101 is shown as being connected to the CPU 103 by a cable 102, which can for instance be or include a local area network (LAN) cable, other wired or wireless connections between the sensor 101 and CPU 103 can be used. The sensor 101 can likewise, in implementations, for instance be connected to the CPU 103 and/or other nodes or devices using Bluetooth™, Wi-Fi™ and/or other wireless connection technologies. The CPU 103 can be or include a general-purpose or special-purpose computer programmed with software, applications, and/or services to perform sensor control and image processing according to the teachings herein. Other devices configured to perform control logic can be used.

In general, the sensor 101 can operate to capture images in front of a vehicle equipped with system 50 for the CPU 103 to process real-time or near real-time traffic information. The CPU 103 can execute software and/or invoke services to analyze each of the images in the resulting image stream, and then use an algorithm such as the one illustrated in FIGS. 5 and 7 or others to alert the driver of possible traffic events.

At any point in time, when the system 50 is operating, the CPU 103 can be configured to send the images captured by the sensor 101 to a video display 106, for instance through a connecting cable 104 or other wired or wireless connections. If the CPU 103 and associated software or logic have detected a traffic event and need to alert the driver, the CPU 103 can in implementations do so by transmitting an audible alarm through cable 105 to a speaker 107. Other alerts or notifications, such as flashing lights or other visual cues, vibrations, or other signals or indications, can also be used.

Figure 2:
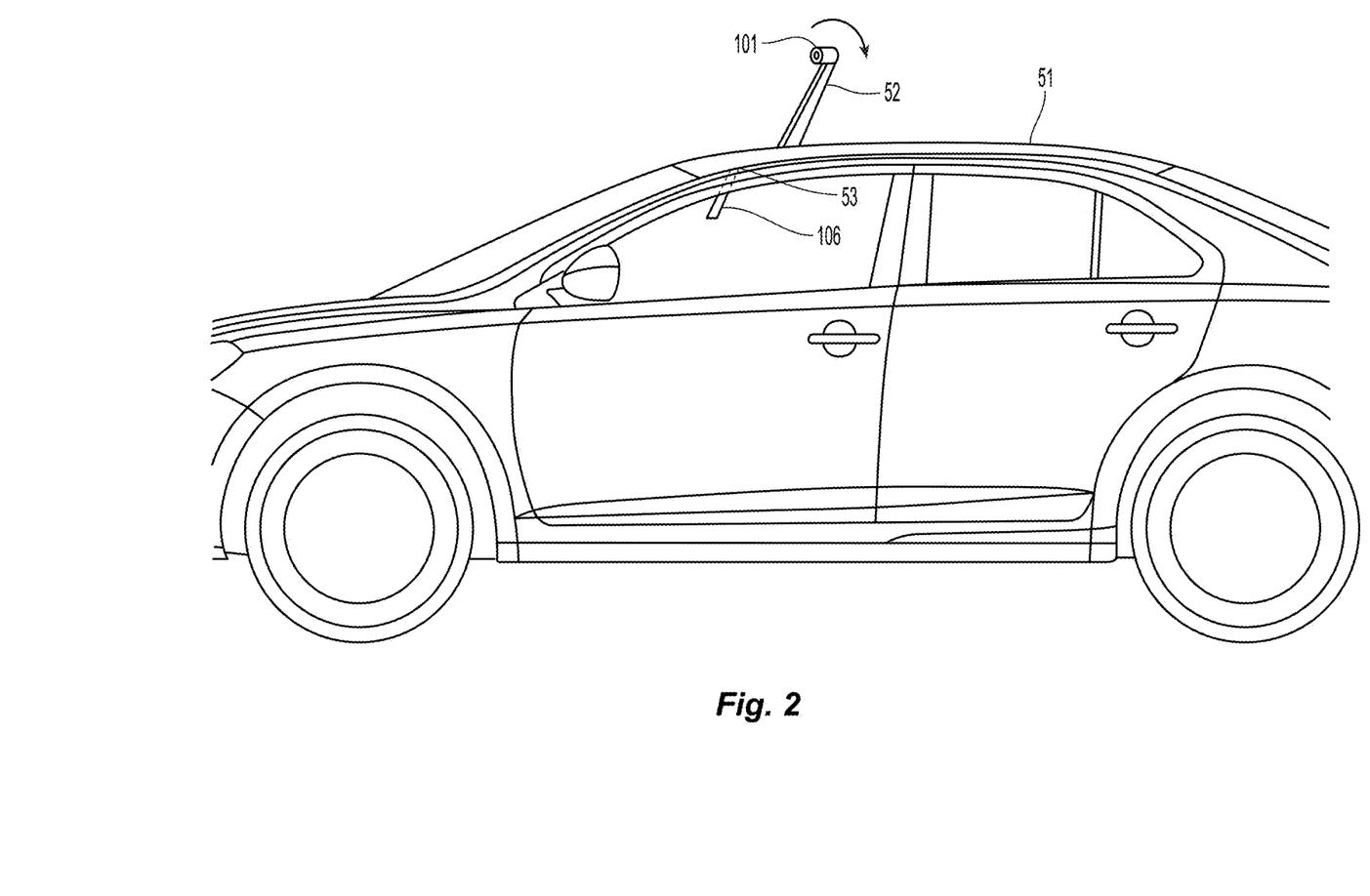
FIG. 2 shows a global view of a system installed on a vehicle with lateral view, according to implementations of the present teachings.

FIG. 2 shows the system 50 as mounted or installed on a vehicle 51. The sensor 101 can in implementations be installed on a support 52. The support 52 can, in implementations, be a rigid element constructed to be high enough to be located at a height or in a plane above the vehicles ahead. In other implementations, the support 52 can be or include a retractable or articulated element, so that the support 52 can for instance be placed in a folded-down or prone position when not in use. In implementations, the support can automatically or under operator input retract for storage in a recess or channel in the roof or other structure of the vehicle 51. The support 52 in those cases can be driven by a motorized drive to an upright state or position, or be returned to a resting state in the recess or other receiving structure or position. In implementations, the support 52 can also or instead be implemented using a telescoping element, for instance to allow an adjustable or selectable height to be reached. In implementations, the motorized drive of the support 52 can likewise be controlled by the CPU 103, and/or other or separate processors or logic.

By mounting the sensor 101 on an extendable support 52, the system 50 can achieve a higher and/or selectable elevation of the CCD or other sensing elements of the sensor 101. The capability to elevate the sensor can permit the sensor to "see" a greater depth or distance into the forward field of view, and/or a wider viewing range, than if the sensor were mounted in a fixed manner to the body of the subject vehicle 51 equipped with the system 50. The greater viewing depth and/or distance can allow the system 50 to detect and take into account the brake light activity or other image details or characteristics produced by more vehicles located farther ahead of the vehicle equipped with the system 50. This can allow the system to draw inferences about traffic events based on a larger number of brake light and other features, over a farther and/or wider field of view, thus enhancing sensitivity, accuracy, and other operating parameters of system 50.

In addition, it will be noted that besides an extendable or articulated support 52, the sensor 101 can be mounted on the support 52 in a rotatable and/or otherwise articulated fashion. For example, the sensor 101 can be attached to the support using a rotary drive element, so that the sensor 101 can be rotated from side to side when the support is in an extended or deployed position. For instance, the sensor 101 can be mounted to the support with a motorized drive to permit horizontal rotation of 180 degrees on a horizontal plane or other amounts, to allow the driver of the vehicle to pan the field of view of the sensor with regard to traffic ahead, and/or to take in a view to the side or rear of the vehicle. In implementations, the sensor 101 and/or mount 102 can be configured to permit vertical adjustments as well, to change the vertical pointing angle and hence range of view provided by the sensor 101 ahead of the subject vehicle. The one or more motors or drives used to drive motion of the sensor 101 can be or include, for instance, direct current (DC) motors, stepper motors, linear motors, and/or others, as understood by persons skilled in the art. Those motorized drives can transmit the driving force to support 52 and/or other members using gears, bearings, and/or other mechanical transmissions.

In terms of internal configuration inside the subject vehicle equipped with system 50, the video display 106 can be mounted on the ceiling 53 of the car or other subject vehicle 51. The video display 106 can be fixed, or can rotate along an axis like a visor, to allow the driver to place the video display 106 at a convenient angle for viewing.

Figure 3:
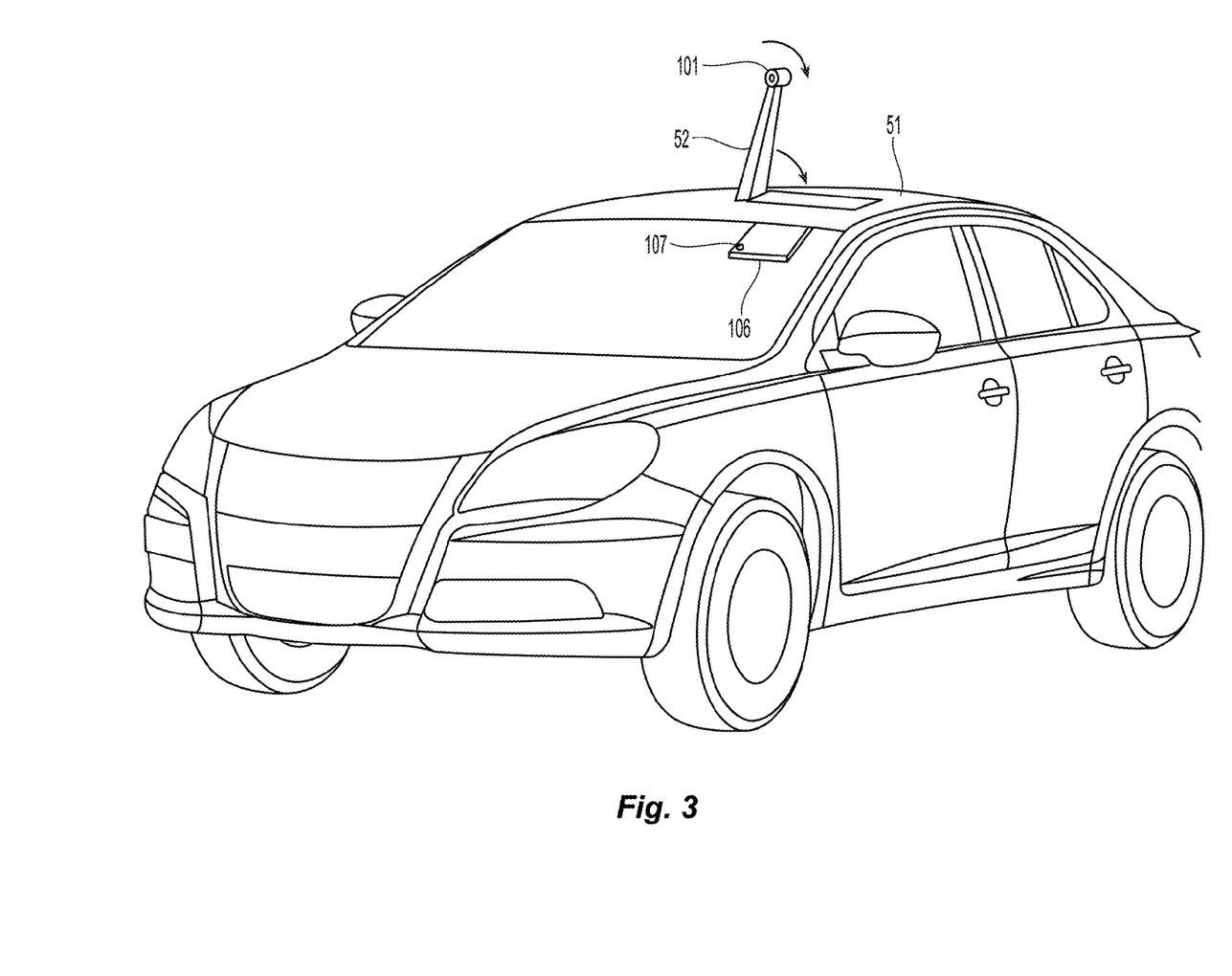
FIG. 3 shows a global view of a system installed on a vehicle in a 3D view, according to implementations of the present teachings.
Figure 4:
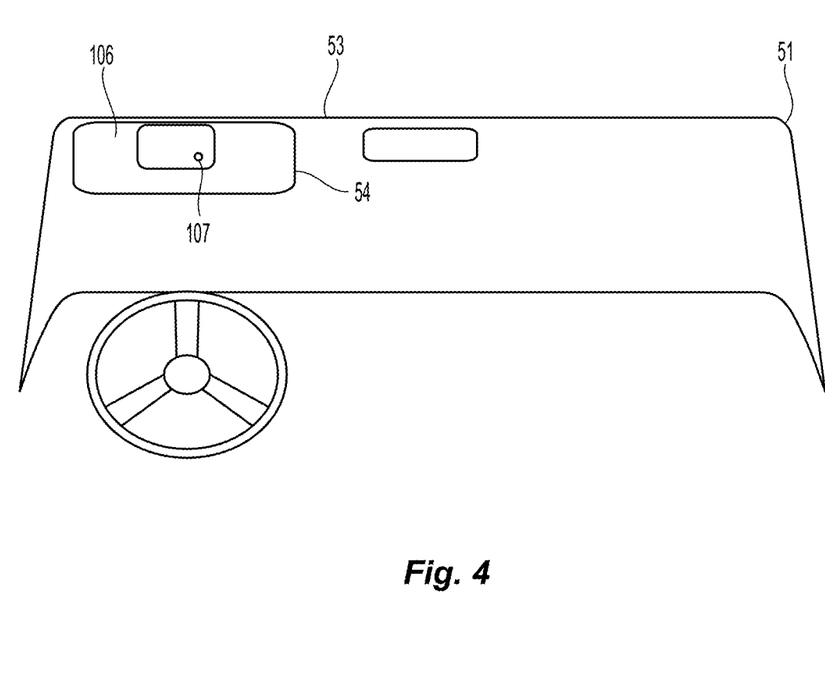
FIG. 4 shows a detailed view of a monitor and how it may be mounted inside a vehicle, according to aspects of the present teachings.
Figure 5:
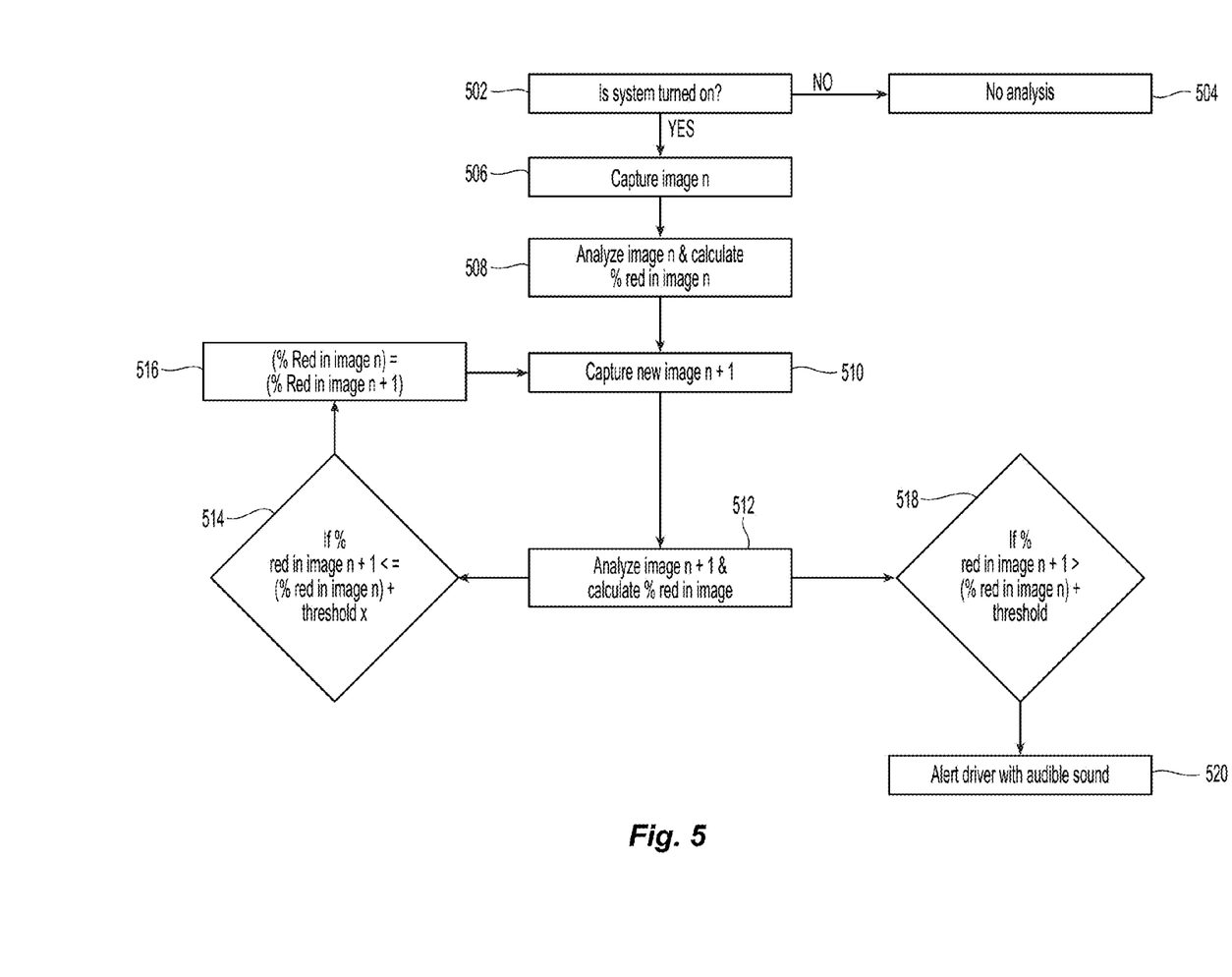
FIG. 5 shows an illustrative flow diagram of detection logic that can be used in implementations of the present teachings.

FIG. 3 illustrates the system 51 mounted on a vehicle 50, but in a further, three-dimensional view. The sensor 101 as shown is installed on a support 52. The video display 106 is shown from the back of that element. As noted a speaker 107 can be used to provide audible warnings or annunciations of traffic events, and can as shown be installed on the video display 106, and/or in other locations. FIG. 4 shows the video display 106 from inside the vehicle 51. The video display can be attached to the ceiling 53, and again can be pulled down the same way the sun visor 54 can rotate. The sound speaker 107 is attached to the video display 106, although once again other types of visual, audible, vibrating, and/or other notifications can be generated FIG. 5 shows a diagram of illustrative processing to analyze the stream of images captured by the sensor 101. In general, each of the images captured by the camera can be compared with the previous image, although comparisons between other frames or collections of frames can be made. In aspects, differences between successive image frames or others can be used to determine if a traffic event is taking place. For instance, the color and/or spectral content of different image frames can be compared to determine if the color content of the field of view is changing. For instance, in implementations, if the second, or new or additional image, has more red color content and/or intensity than the previous one by some threshold, the detection of an event can be triggered. In implementations, the red color content can for instance be identified as pixels having a wavelength of approximately 650 nm, and/or a wavelength range centered on that value. Other color units or measures can be used.

The threshold used to measure changes in red content can be predetermined or set, for instance, to a fixed threshold X by the car manufacturer, the manufacturer of the system 50, and/or others. The value of X can, for instance, represent a value of 10% of the red color content and/or intensity of the previous image or frame. The value of X can, for further instance, also or instead represent a fixed value such as a luminosity value of 25 on a scale of 0 to 255, and/or other fixed or variable values, scales, and/or ranges, if desired in a given application.

In implementations, the threshold can also or instead by dynamically set or adjusted by the CPU 103, for instance, to take into account ambient conditions, such as the overall surrounding red light content from a sunset, sodium vapor lamps along a roadway, or other light sources. For instance, the CPU 103 can be programmed or configured to identify or detect background red color content, so as to detect, merely for example, a red color content of 30 contributed by sodium vapor highly lamps. The CPU 103 can then, for instance, adjust or calibrate the red color content of each pixel in a frame affected by that light source by subtracting 30 from the red luminosity value for each pixel, leaving an adjusted value which removes the influence of that light source. In aspects, the CPU 103 can also or instead account for the presence of sodium vapor lamps or other non-traffic signals by adjusting the threshold X, for example by increasing the value of X from 10% to 15% in the presence of that light source or other spurious signal. As noted, upon detection of a traffic event identified by a change in color or spectral content, an audible alarm and/or other notification can be sent to the driver.

More particularly as shown in FIG. 5, in 502 processing can begin by making a determination whether system 50 is turned on, powered, and/or otherwise in an operational state. If the determination in 502 is no, processing proceeds to 504 in which no analysis is performed. If the determination in 502 is yes, processing proceeds to 506, in which the sensor 101 captures image number "n." In aspects, the captured image can consist of one video frame, and/or other image selections, formats, and/or configurations, such as digital still images or others. In implementations, the captured image and/or image stream can be encoded in standard image formats, such as motion picture experts group (.mpg) format, joint photographic experts group (.jpg) format, raw image format, and/or other formats, encodings, or file types. The sensor 101 can be configured to capture each successive video frame or other unit of data using a predetermined frame rate, such as 30 frames/sec, or others. The image date captured by sensor 101 can be stored by CPU 103 to local storage, such as electronic memory, solid state drives, hard drives, and/or other storage media, if desired.

In 508, the CPU 103 and/or other processor or logic can analyze the color content of the captured frame n, such as for instance by calculating the percentage of red color content in that image frame. Red may be used because that color is produced by standard rear brake lights. It will however be appreciated that other colors can be used in addition or instead when performing a spectral or color analysis of image n. It will also be appreciated that image processing characteristics or signatures other than color content, such as luminance values, motion analysis, or others can likewise be used to analyze the scene or view in front of the vehicle equipped with system 50, and/or in other positions relative to the vehicle, such as to the side or behind the vehicle. In 510, the sensor 101 can capture or acquire a next image or image frame "n+1," acting together with the CPU 103 can capture or acquire a next image or image frame "n+1." In 512, the CPU 103 and/or other processor or logic can similarly calculate the percentage of red color content, or other spectral or other signature, in image or image frame n+1. In 514, the CPU 103 and/or other logic or processor can determine if the percentage, amount, proportion, and/or other value of red color content in image or image frame n+1 is less than or equal to the percentage of red color content in image or image frame n. If so, then processing will proceed to 516, in which a determination can be made that the color content of image/frame n and n+1 are equal. In that case, processing can return to 510. In aspects, processing can return to 510 (and acquire a further image or frame) because no change in red-color content is detected, and the total brake light illumination is assumed to be the same, with no sudden change in forward traffic conditions as represented by that spectral sample.

In 518, the CPU 103 and/or other processor or logic can determine that if the percentage of red color content in image or frame n+1 is greater than that of image or frame n plus a selected threshold (e.g., X=10% of frame n, or other value), then processing can proceed to 520 in which a traffic event is deemed to be detected and the driver can be alerted with an audible sound or other alert or notification. In embodiments, the alert or notification can continue until the driver hits a cancel button, a predetermined timeout takes place, or other conditions occur. Processing can then return to a prior processing point (e.g., 502), jump to a further processing point, or end.

In implementations, the detection logic used by CPU 103 can include additional techniques, including those designed to increase the sensitivity and/or accuracy of event detection. In implementations, averaging and/or other filtering or processing techniques can be used to among other things reduce the number of false positives produced by system 50. In aspects, those techniques can include generating both short-term and long-term averages for the red color content of sets of successive frames (or other frame sets). The image sets can include a short-term image set and a long-term image set, although three or other numbers of sets can likewise be used. The averages of red-color content for the short-term image set and long-term image set can be generated, and those different averages can be used to effectively filter our potentially spurious signals based on their short-term characteristics.

Figure 6:
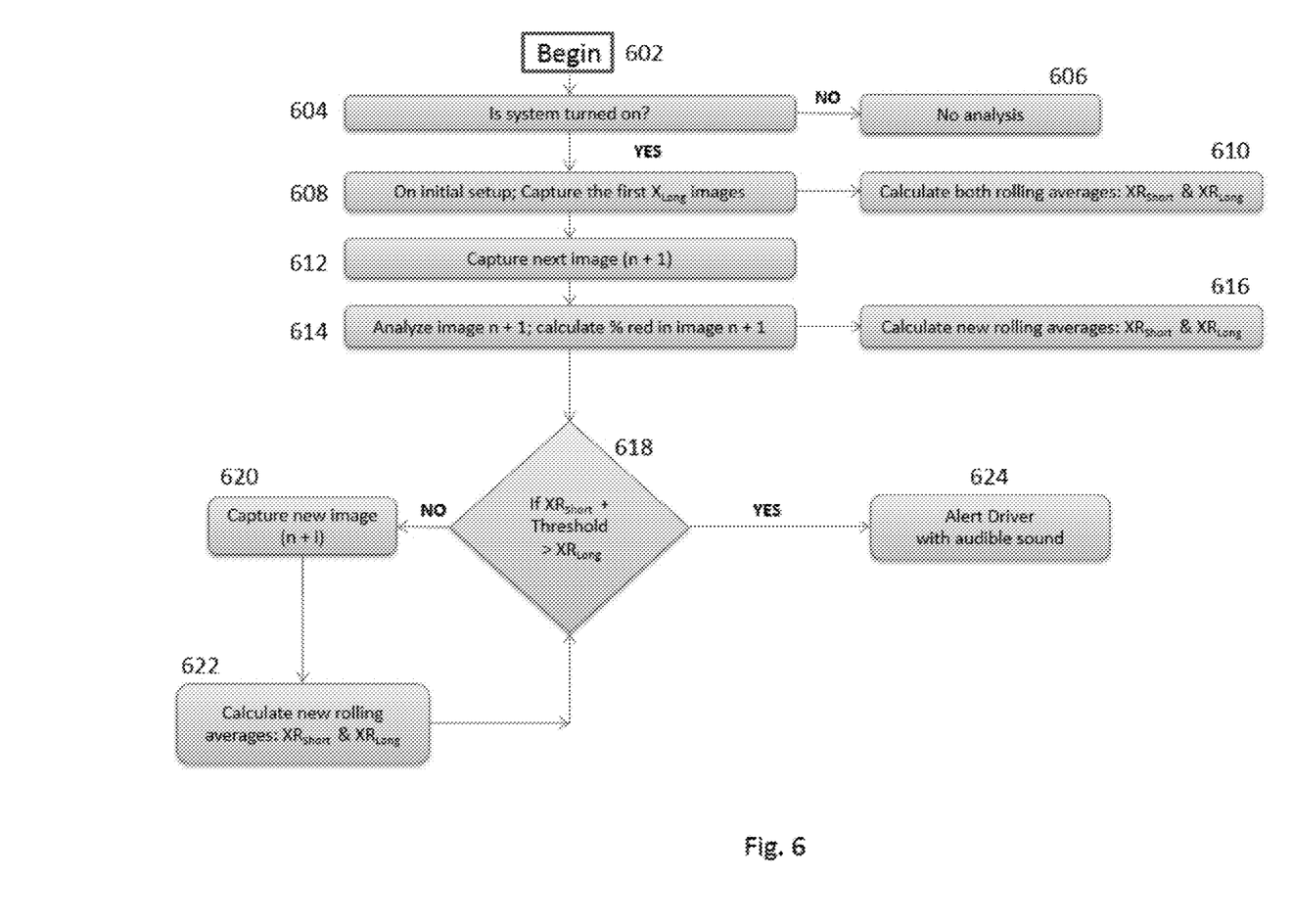
FIG. 6 shows an illustrative flow diagram of detection logic that can be used in various further implementations of the present teachings, including the use of rolling or moving averages for detected red color signals.

Aspects of processing and event detection according to such implementations are for example illustrated in FIG. 6. In connection with hat figure, the following variables, calculations, and/or expressions may be used.

TABLE 1

$X_{Short}$ = Number of images to be analyzed for the short duration rolling average
$X_{Long}$ = Number of images to be analyzed for the long duration rolling average
$P_{Ri}$ = Percentage of red in each image
$XR_{Short}$ = Short rolling average comprised of $X_{Short}$ images (short-term image set)
$XR_{Long}$ = Short rolling average comprised of $X_{Long}$ images (long-term image set)

$X_{Long}$ is always greater than $X_{Short}$.

$$XR_{Short} = \frac{Sum(P_{R1} + P_{R2} + P_{R3} + \ldots P_{RXShort})}{X_{Short}}$$

$$XR_{Long} = \frac{Sum(P_{R1} + P_{R2} + P_{R3} + \ldots P_{RXLong})}{X_{Long}}$$

With those expressions in mind, according to implementations event detection can be carried out using filters or processing involving short and long term averaging, as shown in FIG. 6. As shown in that figure, in 602, processing can begin. In 604, a determination may be made whether the system 50 is turned on, powered, or otherwise in an active state. If the determination in 604 is no, processing can proceed to 606, in which no analysis is performed. If the determination in 604 is yes, processing can proceed to 608.

In 608, on initial setup or processing, a first set of $X_{Long}$ images can be captured. For example, a set of 20, 30, and/or another number of images can be captured or taken to create a first long-term set of images. In implementations, the set of $X_{Long}$ images can be successive images, although it will be appreciated that in implementations, other sets or groups of images can be used, and that one or more images in the set of $X_{Long}$ images can be retrieved from memory or storage, rather than freshly captured. In implementations, the CPU 103 can be configured to allow the user to select or input the number of images to be included in the short-term image set and/or long-term image set, if desired.

In 610, the CPU 103 and/or other logic can calculate both the $XR_{Short}$ and $XR_{Long}$ "rolling" or moving averages, for instance by adding up the red color intensity or lumosity values for matching pixel positions located in 10, 20, 50, and/or other numbers of images or frames, and dividing the total values by the number of images or frames.

In 612, the system 50 can capture the next (n+1) image. In 614, the system 50 can analyze that (n+1) image, including to determine or calculate the percentage of red color content contained in the (n+1) image. In 616, the CPU 103 and/or other logic can calculate or generate an updated set of $XR_{Short}$ and $XR_{Long}$ rolling or moving averages.

In 618, the system 50 can make a determination whether the value of $XR_{Short}$ plus a Threshold is greater than the value of $XR_{Long}$. The Threshold can be or includes a predetermined threshold of the red color percentage or intensity of the previous (n) image, and/or any other fixed or dynamic threshold noted herein. It the determination in 618 is yes, processing can proceed to 624 in which the driver or operator of the vehicle can be alerted with an audible sound, and/or other signals such as vibrations, visual alerts such as a flashing light or warning message, and/or others. The alert in 624 can be configured to persist for a predetermined time, and/or until the driver or operator manually switches the alert off, and/or can continue until other conditions are met.

If the determination of 618 is no, processing can proceed to 620. In 620, the system 50 can capture a further or new image (n+1). In 622, the system 50 can calculate or determine new values for the rolling averages $XR_{Short}$ and $XR_{Long}$. After calculation or determination of those new rolling averages, processing can return to 618 to determine whether the (updated) $XR_{Short}$+Threshold is greater than $XR_{Long}$.

It may be noted that in implementations such as shown in FIG. 6, the accuracy, sensitivity, reliability, and/or other performance characteristics of the system 50 can be enhanced. According to aspects, the detection action can be rendered less susceptible to transient spikes in detected red color content by requiring that the short-term rolling average demonstrate a threshold increase over the long-term rolling average. Transient red color spikes could occur, for instance, as a result of a passing emergency vehicle, or of natural phenomena such as lightning strikes. Elevated red color readings could also be the result of a malfunction in sensor 103 and/or other components of the system 103. By applying the short-term and long-term rolling or moving averages as illustrated in FIG. 6 and otherwise, spurious signals may be reduced or eliminated. This can produce greater accuracy and reliability in the event detection operations of system 50, including to reduce or eliminate false positive events.

Figure 7:
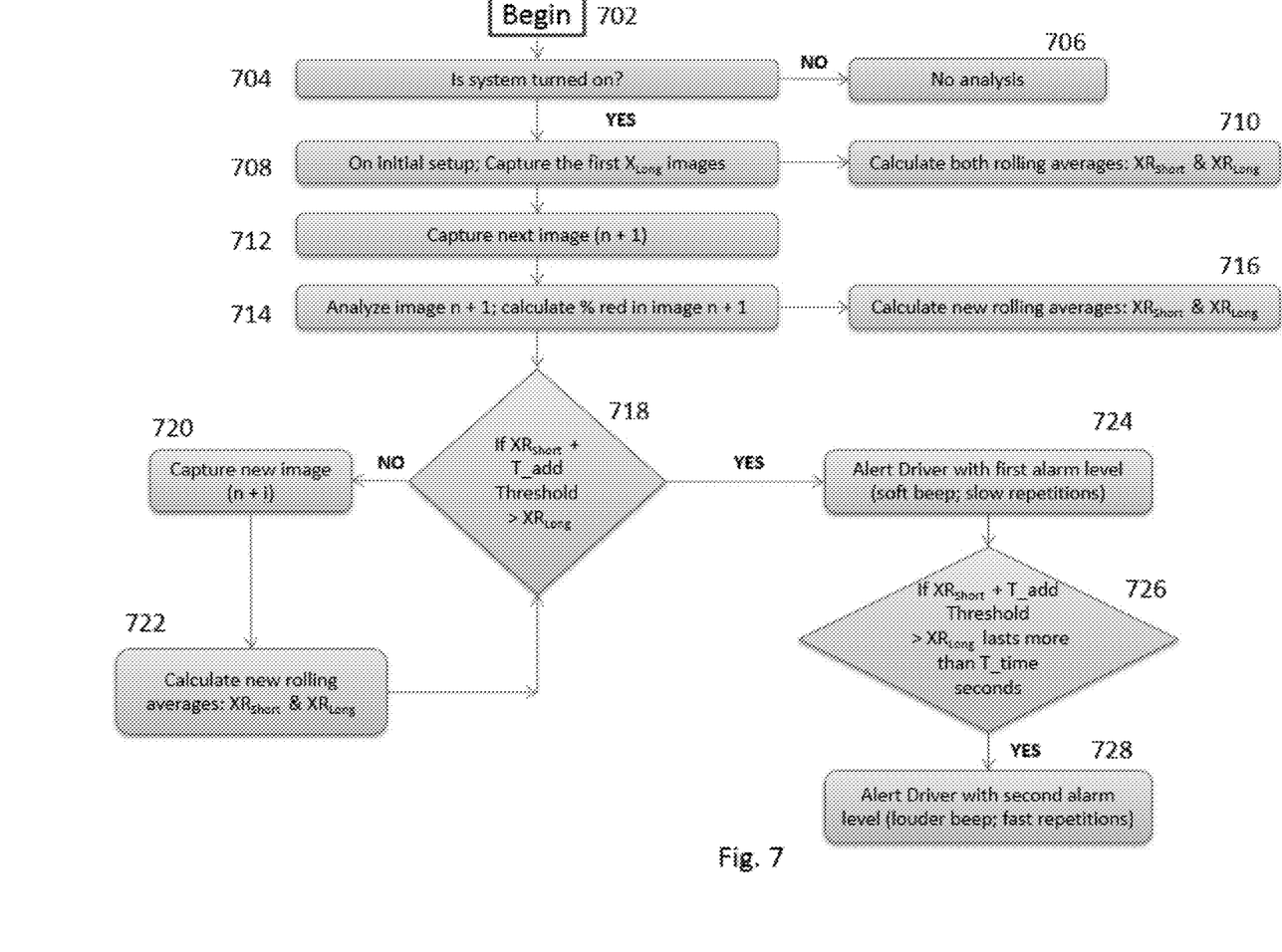
FIG. 7 shows an illustrative flow diagram of detection logic that can be used in various further implementations of the present teachings; including the use of timed periods or delays to recheck for red color intensification or other changes.

In implementations, a moving or rolling average of red color signals can likewise be used, but with the addition of a timer or delay after detection of changes in red signal characteristics. In such implementations, after a change in red signal above threshold, the system can wait for a certain period of time, and then recheck or redetect red signal intensity and/or other image signatures, to verify that a traffic event is taking place. The system can likewise alter or intensify the audible or other alert when a traffic event continues and/or intensifies.

Detection logic according to such implementations is shown in FIG. 7. Variables or quantities shown in FIG. 7 are generally similar to those shown in FIG. 6. As shown in FIG. 7, in 702, processing can begin. In 704, a determination may be made whether the system 50 is turned on, powered, or otherwise in an active state. If the determination in 704 is no, processing can proceed to 706, in which no analysis is performed. If the determination in 704 is yes, processing can proceed to 708.

In 708, on initial setup or processing, a first set of $X_{Long}$ images can be captured. For example, a set of 20, 30, and/or another number of images can be captured or taken to create a first long-term set of images. In implementations, the set of $X_{Long}$ images can be successive images, although it will be appreciated that in implementations, other sets or groups of images can be used, and that one or more images in the set of $X_{Long}$ images can be retrieved from memory or storage, rather than freshly captured. In implementations, the CPU 103 can be configured to allow the user to select or input the number of images to be included in the short-term image set and/or long-term image set, if desired.

In 710, the CPU 103 and/or other logic can calculate both the $XR_{Short}$ and $XR_{Long}$ "rolling" or moving averages, for instance by adding up the red color intensity or lumosity values for matching pixel positions located in 10, 20, 50, and/or other numbers of images or frames, and dividing the total values by the number of images or frames.

In 712, the system 50 can capture the next (n+1) image. In 714, the system 50 can analyze that (n+1) image, including to determine or calculate the percentage of red color content contained in the (n+1) image. In 716, the CPU 103 and/or other logic can calculate or generate an updated set of $XR_{Short}$ and $XR_{Long}$ rolling or moving averages.

In 718, the system 50 can make a determination whether the value of $XR_{Short}$ plus a Threshold is greater than the value of $XR_{Long}$. The Threshold (denoted T_add Threshold to indicate a timer action) can again be or include a predetermined threshold of the red color percentage or intensity of the previous (n) image, and/or any other fixed or dynamic threshold noted herein. If the determination in 718 is yes, processing can proceed to 674 in which the driver or operator of the vehicle can be alerted with first level of alert, such as a relatively soft beep with slow repetitions, and/or other audible sound or sounds. In implementations, other signals or actions can be used such as vibrations, visual alerts such as a flashing light or warning message, and/or others. The alert in 724 can be configured to persist for a predetermined time, and/or until the driver or operator manually switches the alert off, and/or can continue until other conditions are met. In general, the alert generated in 724 is intended to convey a first, initial, and/or low-level alert to the operator of the vehicle.

In 726, the system 50 can determine whether the condition of $XR_{Short}$ plus the T_add Threshold being greater than $XR_{Long}$ lasts longer than a period of T_time seconds. In other words, in implementations as shown, the system 50 can determine if the detection of red color percentage and/or intensity above threshold has persisted for T_time seconds. If it has, the system 50 can react with the understanding that the traffic event has continued and/or may be intensifying. In 726, if the determination is yes, processing can proceed to 728 in which the driver can be alerted with an additional and/or more urgent alarm or notification, such as a louder beep, faster sound repetitions, and/or others.

If the determination of 718 is no, processing can proceed to 720. In 720, the system 50 can capture a further or new image (n+1). In 722, the system 50 can calculate or determine new values for the rolling averages $XR_{Short}$ and $XR_{Long}$. After calculation or determination of those new rolling averages, processing can return to 718 to determine whether the (updated) $XR_{Short+T\_add}$ Threshold is greater than $XR_{Long}$.

It may be noted that in implementations such as shown in FIGS. 6 and 7, the accuracy, sensitivity, reliability, and/or other performance characteristics of the system 50 can be enhanced through the use of rolling or moving averages for red color content detection. According to aspects, the detection action can be rendered less susceptible to transient spikes in detected red color content by requiring that the short-term rolling average demonstrate a threshold increase over the long-term rolling average. Transient red color spikes could occur, for instance, as a result of a passing emergency vehicle, or of natural phenomena such as lightning strikes. Elevated red color readings could also be the result of a malfunction in sensor 103 and/or other components of the system 103. By applying the short-term and long-term rolling or moving averages as illustrated in FIG. 6, FIG. 7, and otherwise, spurious signals may be reduced or eliminated. This can produce greater accuracy and reliability in the event detection operations of system 50, including to reduce or eliminate false positive events.

Moreover, in implementations such as shown in FIG. 7, the system 50 can in effect discriminate between different types of potential traffic events, and/or generate a set of graduated or differentiated alarms or signals to the drive. Among other things, this can convey a sense of increasing potential hazard to the driver of the vehicle, to help ensure their attention is gained and suitable reactions are made, such as applying the brakes of the vehicle, or others.

The inventor herein has conducted certain analyses and run certain models of traffic event detection and related operations, including the use of short-term and long-term rolling or moving averages as discussed herein. Results according to those analyses and studies are shown in the following descriptive Appendix or summary of results, forming a part of this application. The Appendix (A1 through A5) shows analyses including detection results reflecting various modeled traffic or travel conditions. The data, graphs, and other information therein reflect among other things that the detection and effects of short-term and long-term averages for red color content when the subject vehicle and system 50 are located in scenarios involving a variety of potential red-color sources or objects. As shown in the graphs, data, examples, and analyses of A-1 through A-5, use of short-term average and the long-term averages for red color content can likewise be used to trigger graduated alerts or alarms to the driver of the vehicle, as detected red color content persists for selected amounts of time. As noted, the various scenarios which have been analyzed or modelled include the approach of a red colored car, the presence of sky colors from a sunset, a single object scenario, a multiple object scenario, and a scenario with random braking can all generate or result in different detection patterns, but in all cases the use of a short-term and long-term rolling average produces better detection accuracy, and fewer false positive outcomes.

-APPENDIX-

Simulation Name: Red Car(s)

Event: 1 or multiple red cars coming in the opposite direction which slowly increases the amount of red detected by the system.

Parameters

| | |
|---|---|
| Camera in frame per seconds (fps) | 30 |
| Short Rolling Average Period | 30 |
| Long Rolling Average Period | 75 |
| Scenario | Incoming Traffic |
| Basic Threshold T_add (in % red) | 4 |
| Second alert threshold T_time (in seconds) | 3 |

Result: The algorithm avoids signaling incoming traffic: No alert

Simulation Name: Sunset

Event: Sunset is coming down at the horizon, adding more red color to the system but in a slow motion Parameters

| | |
|---|---|
| Camera in frame per seconds (fps) | 30 |
| Short Rolling Average Period | 30 |
| Long Rolling Average Period | 75 |
| Scenario | Freeway |
| Basic Threshold T_add (in % red) | 4 |
| Second alert threshold T_time (in seconds) | 3 |

Result: The algorithm avoids signaling sunset: No alert

Simulation Name: Single Car Braking

Events:

Sudden brake 1 car for half a second
Sudden brake 1 car for 2 seconds
Sudden brake 1 car for 6 seconds Parameters

| | |
|---|---|
| Camera in frame per seconds (fps) | 30 |
| Short Rolling Average Period | 30 |
| Long Rolling Average Period | 75 |
| Scenario | Freeway |
| Basic Threshold T_add (in % red) | 4 |
| Second alert threshold T_time (in seconds) | 3 |

Results: The first event does not trigger an alarm (not long enough for the short moving average to pass the long moving average by T_add threshold). The second event is long enough to trigger the first alarm because the short moving average surpasses the long one by more than T_add, but does not last T_time meaning it doesn't reach the second alarm level. The third event triggers the first alarm and then lasts for more than T_time (3 seconds) to reach the second alarm level (faster beeps and louder)

Simulation Name: Multiple cars braking

Events:

Sudden brake for half a second multiple cars
Sudden brake for 2 seconds multiple cars
Sudden brake for 6 seconds multiple cars Parameters

| | |
|---|---|
| Camera in frame per seconds (fps) | 30 |
| Short Rolling Average Period | 30 |
| Long Rolling Average Period | 75 |
| Scenario | Freeway |
| Basic Threshold T_add (in % red) | 4 |
| Second alert threshold T_time (in seconds) | 3 |

Results: With the current thresholds, multiple cars applying the brakes for half a second will trigger the first alarm because it's a multiple car event. The short moving average surpasses the long one by more than T_add and the first alarm is triggered with a slow beep and low noise level (first event). The second event also triggers the first event but does not trigger the second alarm level because it doesn't last more than T_time. If the brakes persist for a longer period of time (> T_time), the alarm moves to the second louder alert and faster repetitions. (3rd event below)

Simulation Name: Multiple cars braking at random moments

Events:

Random braking events on the freeway
Random braking events on the freeway with intensity increasing Parameters

| | |
|---|---|
| Camera in frame per seconds (fps) | 30 |
| Short Rolling Average Period | 30 |
| Long Rolling Average Period | 75 |
| Scenario | Freeway |
| Basic Threshold T_add (in % red) | 4 |
| Second alert threshold T_time (in seconds) | 3 |

Results: With the current thresholds, the first event does not trigger an alarm because there are not enough cars braking at the same time. These are all random events and are not related. The second event triggers an alarm as the intensity of red increases suddenly. It stops after the red goes back to lower level, to increase again after multiple cars apply brakes once again. After 3 seconds, the second alarm kicks in because the second trigger (T_time) is initiated.

The foregoing description is illustrative, and variations in configuration and implementation may occur to persons skilled in the art. For example, while implementations have been described in which system 50 operates using one sensor 101, again in implementations, two or more sensors 101 can be employed. For instance, two or more sensors 101 can be mounted in a forward position on the vehicle. In other instances, one or more sensors 101 can likewise of instead be mounted on the side or sides of the vehicle, or in the rear.

Similarly, while embodiments have been described in which image processing and control logic are executed in one CPU 103, in implementations, multiple CPUs and/or networked or remote computing resources or services can be used, including those hosted in a cloud-based network. Other resources described as singular or integrated can in embodiments be plural or distributed, and resources described as multiple or distributed can in embodiments be combined. The scope of the present teachings is accordingly intended to be limited only by the following claims.

What is claimed:

1. A sensor assembly, comprising:
   a sensor, the sensor being adapted to be attached to an extendable support and configured to generate an image stream of an area in front of the vehicle for automated traffic event detection; and
   control logic, connected to the sensor, the control logic being configured to:
      automatically analyze the image stream, and
      detect a traffic event in front of the vehicle based on a comparison of rolling averages generated based on at least two sets of images from the image stream wherein the rolling averages comprise at least a short-term rolling average based on a short-term image set and a long-term rolling average based on a long-term image set, and the long-term rolling average is generated by dividing a sum of red color content for matching pixels in the long-term image set by the number of images contained in the long-term image set, and
   wherein the detecting a traffic event comprises detecting whether the short-term rolling average plus a selected threshold exceeds the long-term rolling average and detecting a change in average red-color intensity in the short-term rolling average compared to the long-term rolling average.

2. The assembly of claim 1, wherein the detecting a traffic event comprises detecting whether the short-term rolling average plus a selected threshold exceeds the long-term rolling average for a selected period of time.

3. The assembly of claim 2, further comprising—
   generating a first alert to a driver of the vehicle when the short-term rolling average plus a selected threshold exceeds the long-term rolling average, and
   generating at least a second alert to a driver of the vehicle when the short-term rolling average plus a selected threshold exceeds the long-term rolling average for the selected period of time.

4. A method of automatically detecting traffic events, comprising:
   automatically analyzing an image stream of an area in front of a vehicle generated by at least one sensor, and
   detecting a traffic event in front of the vehicle based on a comparison of rolling averages generated based on at least two sets of images from the image stream, wherein the detecting a traffic event comprises detecting a change in average red-color intensity in the short-term rolling average compared to the long-term rolling average, and
   wherein the rolling averages comprise at least a short-term rolling average based on a short-term image set and a long-term rolling average based on a long-term image set, and the long-term rolling average is generated by dividing a sum of red color content for matching pixels in the long-term image set by the number of images contained in the long-term image set, and
wherein the detecting a traffic event comprises detecting whether the short-term rolling average plus a selected threshold exceeds the long-term rolling average.

5. The method of claim 4, wherein the detecting a traffic event comprises detecting whether the short-term rolling average plus a selected threshold exceeds the long-term rolling average for a selected period of time.

6. The method of claim 5, further comprising—
   generating a first alert to a driver of the vehicle when the short-term rolling average plus a selected threshold exceeds the long-term rolling average, and
   generating at least a second alert to a driver of the vehicle when the short-term rolling average plus a selected threshold exceeds the long-term rolling average for the selected period of time.

* * * * *